(12) United States Patent
Luz

(10) Patent No.: US 6,961,498 B2
(45) Date of Patent: Nov. 1, 2005

(54) COUPLING DEVICE FOR THE ALIGNMENT OF AN OPTICAL WAVEGUIDE

(75) Inventor: Gerhard Luz, Bietigheim-Bissingen (DE)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/440,243

(22) Filed: May 19, 2003

(65) Prior Publication Data

US 2003/0228111 A1 Dec. 11, 2003

(30) Foreign Application Priority Data

Jun. 11, 2002 (EP) .............................................. 02360169

(51) Int. Cl.[7] .................................................. G02B 6/26
(52) U.S. Cl. ............................ 385/52; 385/16; 385/147
(58) Field of Search .............................. 385/52, 88, 90, 385/16, 49–51, 147

(56) References Cited

U.S. PATENT DOCUMENTS

| | | | | |
|---|---|---|---|---|
| 4,193,664 A | * | 3/1980 | Ellwood ....................... | 385/65 |
| 6,724,960 B1 | * | 4/2004 | Ruegenberg et al. ......... | 385/52 |
| 2002/0071638 A1 | * | 6/2002 | Musk .......................... | 385/52 |

FOREIGN PATENT DOCUMENTS

| | | |
|---|---|---|
| DE | 199 34 179 A1 | 1/2001 |
| DE | 199 34 183 A1 | 1/2001 |
| DE | 199 34 184 A1 | 1/2001 |
| JP | 62021106 A * | 1/1987 ............. G02B/6/24 |
| WO | WO 98/13718 A1 | 4/1998 |
| WO | WO 01/07949 A1 | 2/2001 |
| WO | WO 01/07956 A1 | 2/2001 |

* cited by examiner

*Primary Examiner*—Juliana Kang
(74) *Attorney, Agent, or Firm*—Moser, Patterson & Sheridan, LLP

(57) ABSTRACT

The choice for the optical coupling device of a holder that has only one support makes it possible to keep this optical component compact. This is advantageously achieved in that according to the invention the support surrounds the extensible element. The carrier of the optical waveguide thus remains in the immediate environment of the support and the point at which the optical coupling device is to be attached to the optical component. The alignment of the end of the optical waveguide is thus not impaired by unavoidable curvatures of the optical component. The configuration according to the invention of the support of an alternative optical coupling device with a movable arm as an additional connection to the hinge-like web at one end of the carrier of the optical waveguide makes it possible to achieve even more precise alignment of the end of the optical waveguide. The operation of this additional arm can be effected with the aid of a micromechanical screw incorporated in the support or by plastic deformation.

11 Claims, 5 Drawing Sheets

(PRIOR ART)

(PRIOR ART)

COUPLING DEVICE FOR THE ALIGNMENT OF AN OPTICAL WAVEGUIDE

TECHNICAL FIELD

The invention relates to an optical coupling device for the alignment of an optical waveguide supported in a holder. The holder is formed from a support to a surface, the latter containing an end surface, to which the end of the optical waveguide is to be connected. The invention is based on a priority application EP 02 360 169.3 which is hereby incorporated by reference.

BACKGROUND OF THE INVENTION

The continuing development of optical components such as waveguide gratings (PHASAR "phase array" or AWG "array waveguide grating"), in which a plurality of in-/outputs are formed via optical waveguides and optical signals are transmitted with the aid of carrier wavelengths that are selected ever more closely adjacent, is leading to an intensification of the coupling conditions with regard to the interface of the optical waveguides with the optical component. Such optical components must remain capable of functioning as well as possible under very different conditions. Amongst other things, the functionalities of the optical components must remain independent of the major temperature variations to which they can be exposed. Optical components are formed from a carrier, which can be sufficiently deformed e.g. by temperature variations of this kind or also due to the weight distribution imposed on it, that the optical in-/outputs can be affected by it. In the worst case, such deformations can lead to such a poor alignment of optical in-/outputs, which alignment can lead to a noticeable impairment of the transmission of optical signals.

To compensate for such alignment errors in the optical in-/outputs, specific coupling devices are used. These consist mainly of a carrier of the respective optical in-/outputs and at least one support to the optical component. The carrier is connected to the support such that a change in the alignment of the end of the optical waveguide carried is permitted. An optical coupling device of this kind is described in WO 98/13718. The connection presented there (see enclosed FIG. 1) between the carrier 7 and support 4 is formed by an expansion element 10. Expansion elements of this kind can be made e.g. of a piezoelectric material. In this case, the controlled application of a voltage to the expansion element leads to the alignment of the end of the optical waveguide. It is even possible with the aid of such an optical coupling device to fix the central wavelength of a waveguide grating by the position of the waveguide to be connected that conducts the light into the injection waveguide of the waveguide grating. In this way the central wavelength of the waveguide grating can be adjusted accurately due to the geometrical positioning of the end surface 6 of waveguide 2 in relation to the end surface 5 of the injection waveguide of this waveguide grating.

It is even possible to form an adjustable or flexible waveguide grating. With the aid of such a coupling device, a certain output wavelength of the waveguide grating can be selected, e.g. central wavelength, for adaptation to the operating requirements, to compensate for the aging of transmitter lasers, for example.

The optical coupling device disclosed in WO 98/13718 consists of a holder 3 with a support 4 to the optical component and a carrier 7 for the optical waveguide 2, the carrier 7 being held by the support 4 via the variable-length element 10. Vibrations or bending of the variable-length element 10 and thus temporary or permanent misalignment of the end of the optical waveguide can occur in this case, although some control of the alignment is provided by the variable-length element. A diagrammatic assessment of the curvature of the optical component is shown in FIG. 2. The optical components used, manufactured from a silicon substrate and glass layer, are not actually perfectly flat owing to the different thermal expansion properties of these materials. The optical component accordingly has a curvature of a radius of approx. 15 m. For a holder 3 with a variable-length element 10 that is 15 mm long and a 2 mm thick carrier 7, d=17. The deviation h1 of the end surface 6 of the optical waveguide 2 held by the carrier 7 from the surface 5 of the optical component can amount to 7 $\mu$m. This leads to an unacceptable loss of up to 3 dB.

An optical coupling device (see enclosed FIG. 3) is described in WO 01/07949 and consists of two supports 4a, 4b, between which a variable-length element 10 is incorporated. The mounting of the optical waveguide 2 is held by a carrier 7' on one side on the variable-length element 10 and on the other side by the one support 4b. This support 4b is formed sprung here. Thus movement of the variable-length element 10' and the carrier 7 of the optical waveguide 2 is permitted in a longitudinal direction of the variable-length element 10' in which the variable-length element expands or contracts. On the other hand, movement of the variable-length element 10' perpendicular to the longitudinal direction of the variable-length element is prevented, the sprung support 4b being held close to the fixing of the optical coupling device to the position of the optical component to which the end of the optical waveguide is to be aligned. This support 4b should be formed such that the optical waveguide is held via this sprung support as close as possible to the fixing. The variable-length element 10', which is unavoidably fastened further away on the optical component, presses the carrier 7' of the optical waveguide 2 against the support 4b and thus facilitates a movement of the optical waveguide 7' relative to the optical component. The sprung support 4b is designed such that a residual movement perpendicular to the plane is suppressed as fully as possible. This should lead to the movement of the optical waveguide 2 relative to the optical component being executed very exactly parallel to the surface 5 of the optical component and virtually no misalignment occurring perpendicularly to this.

The losses with such an optical coupling device can be assessed with reference to FIG. 4. With a variable-length element 10' of a length of 15 mm and a carrier 7' for the optical waveguide 2 of a diameter of 4 mm, d comes to 17 mm in total. At a distance of the carrier 7' from the sprung support 4b of 1 mm, the distance $d_2$ between the optical waveguide 2 and this sprung support 4b is roughly 3 mm. If the optical component has a radius of curvature of 15 m, the deviation h resulting from this will be 0.9 Em. In comparison with the previous example in FIG. 2, the loss will only be 0.2 dB.

However, the dimensions of an optical holder 3' of this kind with 2 supports 4a and 4b are very large. The total length is approximately 25 to 30 mm and can thus be greater than some optical components, e.g. waveguide gratings with a smaller number of channels. Such holders 3' can therefore only be used for very large optical components. In addition, the structure of such a holder is aggravated by the size, particularly in the event that the material for the supports is selected according to the expansion property of the optical component.

SUMMARY OF THE INVENTION

The object of the invention is to develop further an optical coupling device for the alignment of an optical waveguide, which coupling device has a long-term stable property with minimal optical losses and is to be used for different optical components.

The object is achieved according to the invention by an optical coupling device for the alignment of an end of an optical waveguide, with a holder, which is formed from a support to a surface, which contains an end surface to which the end of the optical waveguide is to be connected, and from a variable-length element attached on the one hand to the support and connected on the other hand to a carrier carrying the optical waveguide, wherein the variable-length element is surrounded at least partly by the support.

The choice for the optical coupling device of a holder that has only one support makes it possible to keep this optical component compact. In this case the disadvantages in the example of the holder 3 in FIG. 1 from WO 98/13718 are eliminated, in that the support surrounds the extensible element according to the invention. Thus the carrier of the optical waveguide remains in the immediate environment of the support or the place at which the optical coupling device is to be fastened on the optical component. Thus the alignment of the end of the optical waveguide is advantageously not impaired by unavoidable curvatures of the optical component. In addition, the construction of an optical coupling device of this kind is compact, making it suitable for very different optical components.

The configuration according to the invention of the support of an alternative optical coupling device with a movable arm as an additional connection to the hinge-like web at one end of the carrier of the optical waveguide makes it possible to achieve a still more precise alignment of the end of the optical waveguide. The operation of this additional arm can be achieved with the aid of a micromechanical screw built into the support or by plastic deformation.

BRIEF DESCRIPTION OF THE DRAWINGS

Several embodiments of the invention are now explained in further detail with reference to the enclosed drawings.

DETAILED DESCRIPTION OF THE PREFERRED EMBODIMENTS

Figure 1:
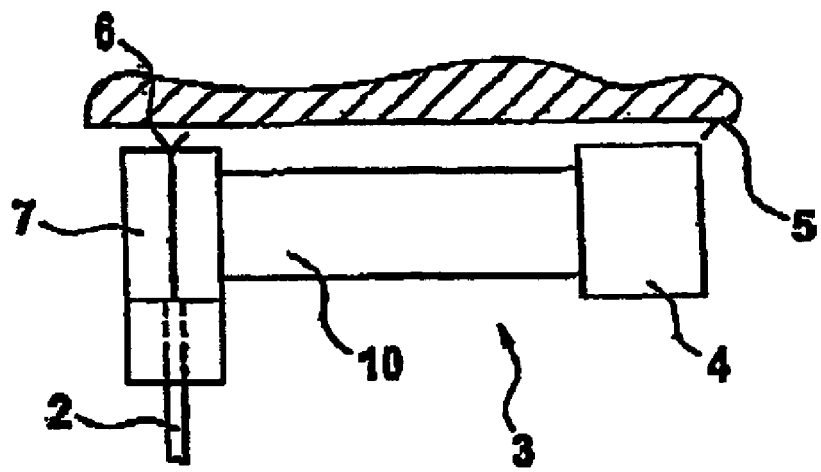
FIG. 1 shows a diagrammatic side view of an optical coupling device from the prior art.
Figure 2:
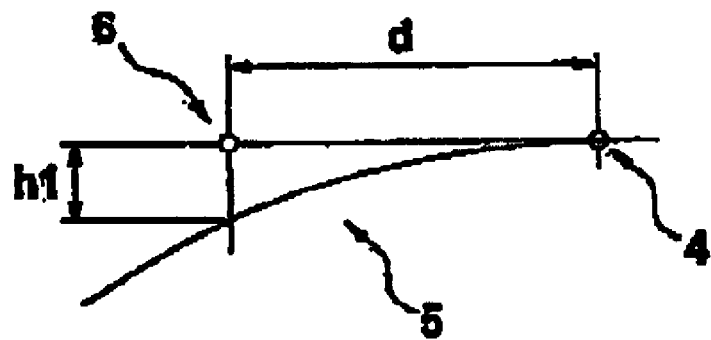
FIG. 2 shows a diagrammatic assessment of the influence of the curvature of the optical component on the optical coupling device according to FIG. 1.
Figure 3:
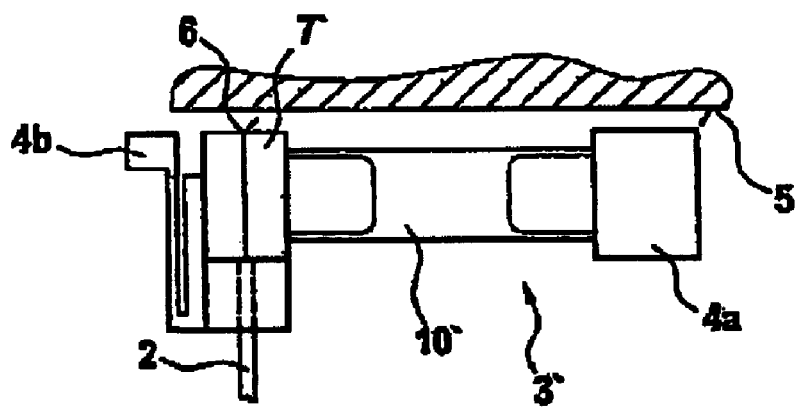
FIG. 3 shows a diagrammatic side view of an optical coupling device from the prior art.
Figure 4:
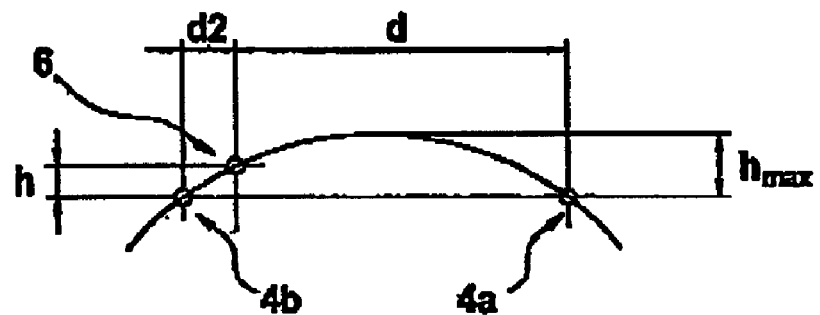
FIG. 4 shows a diagrammatic assessment of the influence of the radius of curvature of the optical component on the optical coupling device according to FIG. 3.

FIGS. 5 to 8 show four embodiments according to the invention of an optical coupling device for the alignment of an end 6 of an optical waveguide 2. They are formed from a holder 13, 13', 23, 23' that has a support 14, 14', 24, 24'. The optical coupling device is fastened with the aid of this support 14, 14', 24, 24' to an optical component, e.g. by gluing the support onto the end surface 5 of the optical component.

The optical waveguide 2 with its end 6 that is to be connected to a certain end surface of the optical component is located in a carrier 17, 17', 27, which is connected to the support 14, 14', 24, 24'. This connection between the carrier 17, 17', 27 and the support 14, 14', 24, 24' is formed by a variable-length element 18, 28. This variable-length element 18, 28, is at least partly surrounded by the support 14, 14', 24, 24', so that the optical coupling device has an advantageously compact construction.

Optical coupling devices of this kind are mounted on a certain point of a surface 5 of an optical component, in the immediate environment of one end surface to which the end 6 of the optical waveguide 2 is to be connected. This end surface can be e.g. the end of an optical waveguide structured on the optical component or also the connection surface of an opto-electrical component that has either been structured or mounted on the optical component.

The carrier 17, 17', 27 of the optical waveguide 2 is also held at one end by the support 14, 14', 24, 24' via a hinge-like web 15, 15', 25. This hinge-like web 15, 15', 25 has a fulcrum that lies perpendicular to the surface that contains the variable-length element 18, 28 and correspondingly the deflection of the carrier 17, 17', 27 resulting from this. Thus this hinge-like web 15, 15', 25 leads to stabilization of the carrier 17, 17', 27 relative to lateral vibrations without restricting a deflection of the carrier 17, 17', 27.

As shown in the four embodiments in FIGS. 5 to 8, the carrier 17, 17', 27 can additionally be held at its second end, i.e. around the end of the optical waveguide 2 to be aligned via a sprung arm 16, 16', 26 on the support 14, 14', 24, 24'. This sprung arm 16, 16', 26 increases the stability of the carrier 17, 17', 27 relative to disruptive vibrations. The springing serves to guide the carrier in an original alignment if the variable-length element 18, 28 recovers its original length due to the effect of environmental parameters.

It can be particularly advantageous to produce the support 14, 14', 24, 24' with the web 15, 15', 25, the arm 16, 16', 26 and the carrier 17, 17', 27 from one monolithic block. In addition to the cost advantages in the manufacture of such holders, the choice of a monolithic block will lead to a markedly more stable holder. It can be expedient for this purpose to select an expansion coefficient of the monolithic block that is smaller than that of the variable-length element 18, 28. Accordingly a change in the ambient temperature, for example, will have a stronger influence on the variable-length element 18, 28 than on the monolithic block. This, combined with the geometrical configuration of the support 14, 14', 24, 24' similar to a large U that surrounds the variable-length element 18, 28, makes it possible to achieve a great span for the alignment of the end 6 of the optical waveguide 2 without being restricted too greatly by disadvantages, as is the case e.g. with the above-quoted prior art. The deflection of the carrier 17, 17', 27 for alignment of the end 6 of the optical waveguide 2 is to be affected in a particularly amplified manner by the choice of the variable-length element 18, 28 in the area of the middle of the carrier 17, 17', 27. This makes it possible to use an optical coupling device according to the invention to fully connect or disconnect the connection of the end 6 of the optical waveguide 2 to one end surface of the optical component, and thus to facilitate use of the optical coupling device as an optical switch.

It can be advantageous to make both the monolithic block and the variable-length element 18, 28 from different metals, and thus attach the latter with the aid of welding technology to the support 14, 14', 24, 24' and/or the carrier 17, 17', 27. The monolithic block can be made in a good quality from such a material relatively easily with the aid of "wire erosion processing". Other materials such as e.g. silicon or Pyrex can be used for the monolithic block. Although they are harder to manufacture, they have the advantage of being more stable in the event of a temperature change owing to a smaller expansion coefficient. The variable-length element as such can also be made from a piezoceramic material and is then attached to the support 14, 14', 24, 24' and the carrier 17, 17', 27 by gluing. The choice of piezoceramic material is particularly apt for an optical coupling device serving as an optical switch.

Figure 5:
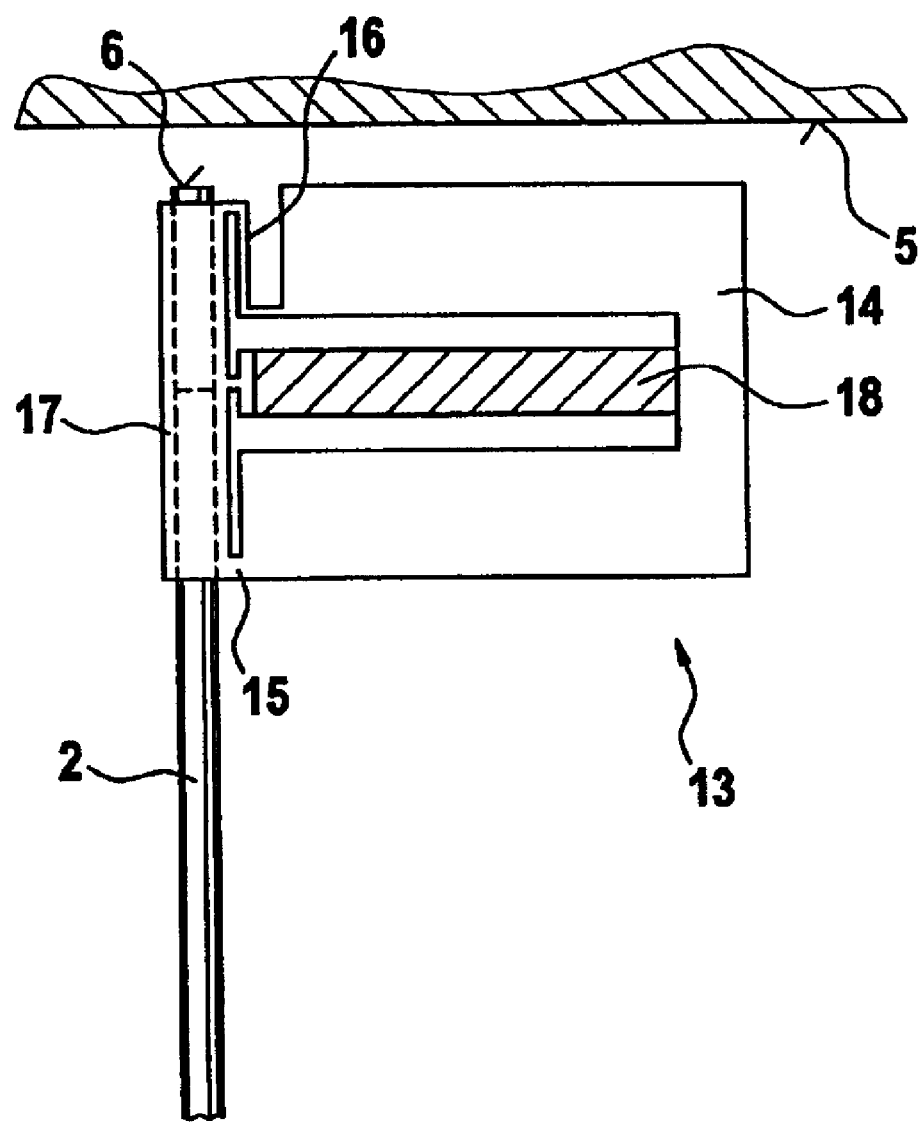
FIG. 5 shows a diagrammatic side view of a first embodiment of an optical coupling device according to the invention.

FIG. 5 shows a side view of an embodiment of an optical coupling device according to the invention. The holder 13 is mounted via a leg of the U-shaped support 14 on the surface 5 of the optical component and attached e.g. by gluing. The carrier 17 of the optical waveguide 2 is attached laterally to the support 14 via the hinge-like web 15 and the sprung arm 16 at the two ends of the support 14. In addition, the variable-length element 18 is fitted into the U-shaped support 14 between the two legs such that it is supported with one of its two ends on the connection of the two legs of the U-shaped support 14 by being fastened to it. The opposite end of the variable-length element 18 is supported directly on the carrier 17. The variable-length element 18 is thus surrounded by the U-shaped support 14.

Supporting of the variable-length element 18 roughly on the middle of the length of the carrier 17 makes it possible to achieve more than a factor 2 in the movement of the end 6 of the optical waveguide 2 per unit of length variation of the element 18. This makes it possible to guarantee very great deflection of the carrier 17 while still keeping the dimensions for the optical coupling device small.

The original length of the variable-length element 18 can thus be halved with the same magnitude of alignment of the carrier 17, resulting in a very compact construction of the optical coupling devices. For example, the overall length of the optical coupling device can amount to roughly only 12.5 mm if a variable-length element 18 of aluminium with a length of roughly 7.5 mm is used. For a variable-length element 18 of steel with a smaller expansion coefficient, the total length of the optical coupling device will be roughly 17 mm. The choice of steel nevertheless has the advantage that the variable-length element 18 can be attached to the support 14 with the aid of welding technology, e.g. under laser. An attachment of this kind can be more stable in the long term than gluing.

As well as the variable-length element 18, 28, it can be particularly advantageous to have an additional option with which the deflection of the carrier 17 can be determined even more precisely. This is particularly important when setting a central wavelength of an athermal optical component or determining the zero point. In addition, the tuning capability for waveguide gratings with the aid of thermal influences is in the order of 30 pm per wavelength and $\mu$m unit of displacement. The tuning capability with the aid of thermal influences is defined by the difference in temperature between the optical component and the optical coupling device during the connection.

Figure 6:
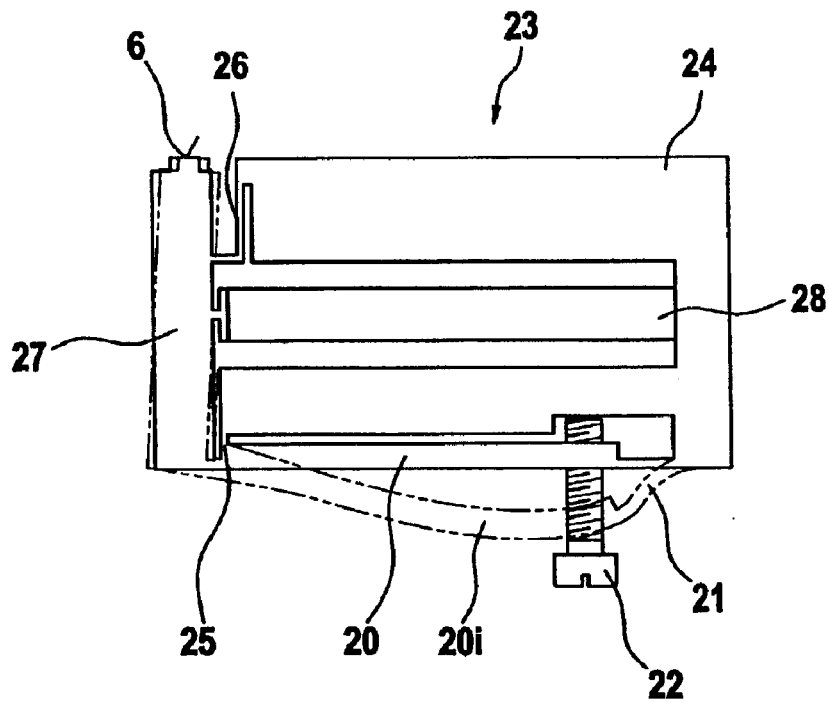
FIG. 6 shows a diagrammatic side view of a second embodiment of an optical component according to the invention.
Figure 7:
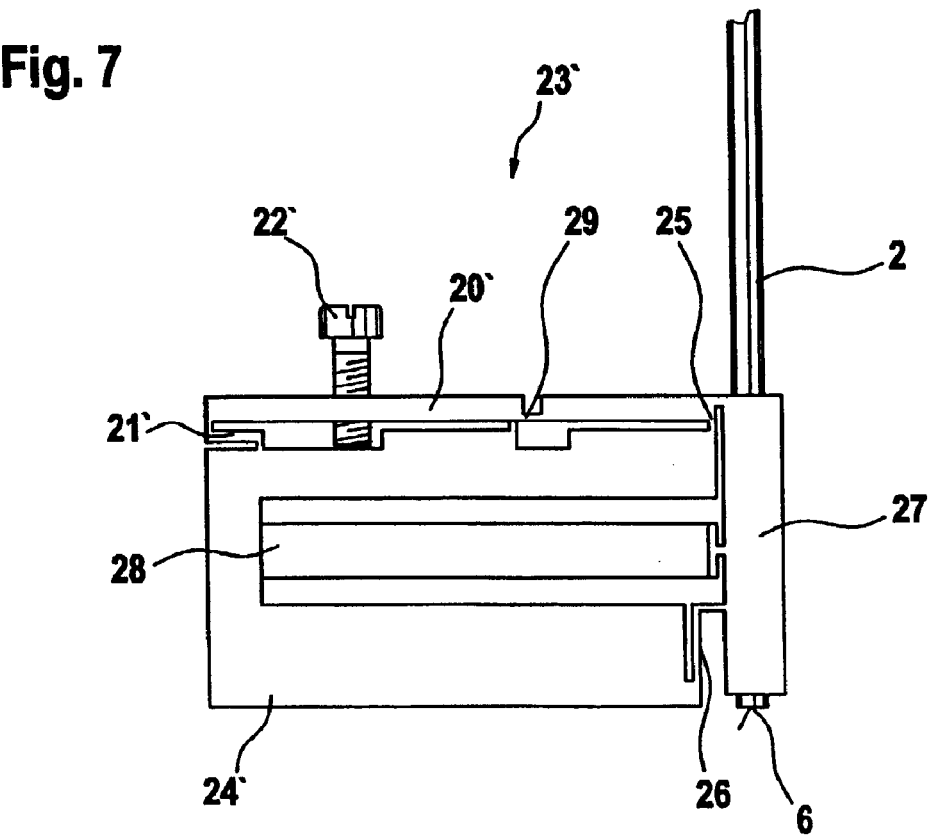
FIG. 7 shows a diagrammatic side view of a third embodiment of an optical component according to the invention.
Figure 8:
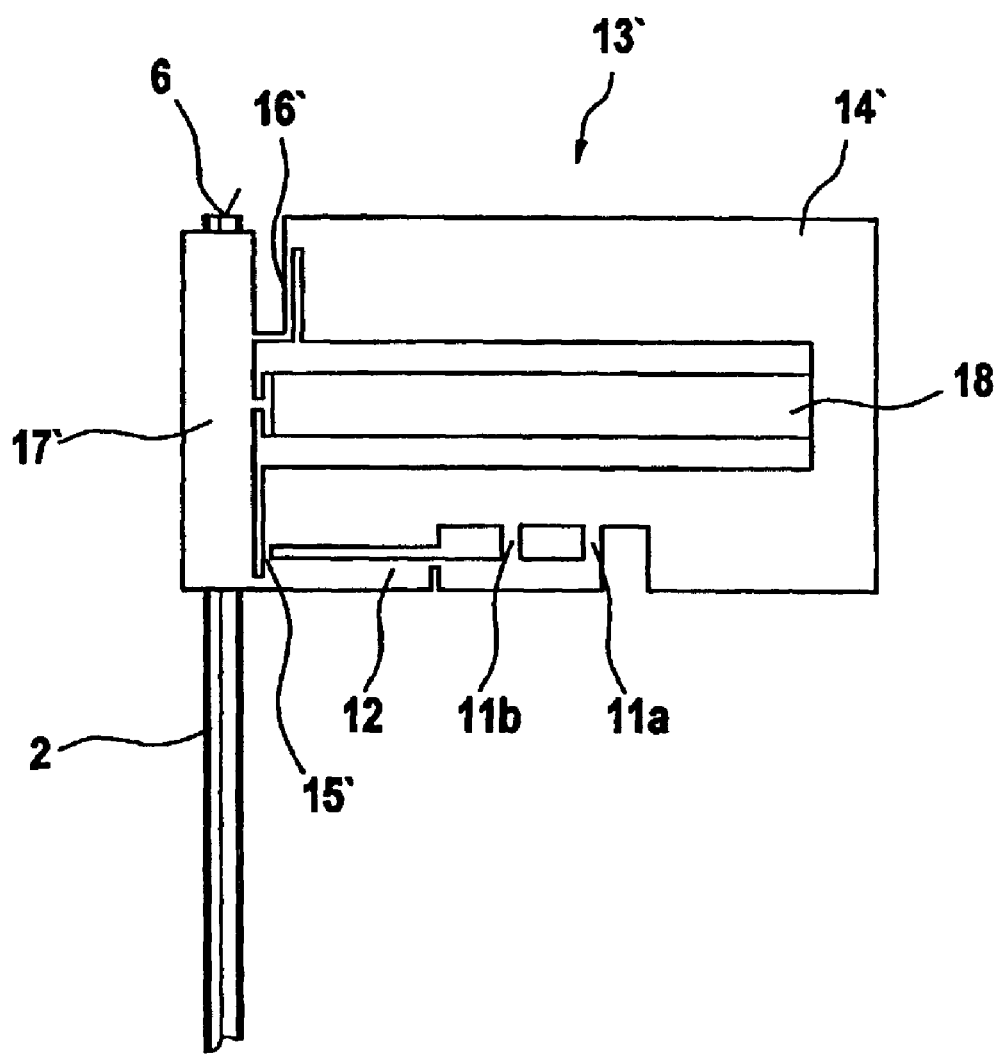
FIG. 8 shows a diagrammatic side view of a fourth embodiment of an optical component according to the invention.

FIGS. 6 to 8 show three embodiments of optical coupling devices in which in addition to the variable-length element 18, 28, the support 14', 24, 24' is connected to the hinge-like web 15', 25 via a movable arm 12, 20, 20'. The movement of the additional arm 12, 20, 20' leads to a still more precise deflection of the carrier 17, 17', 27 than can be achieved by operation of the variable-length element 18, 28 alone.

FIG. 6 shows a side view of a first embodiment of an optical coupling device with the additional movable arm 20. This arm 20 is part of the leg of the U-shaped support 24, 24' furthest away from the optical component. In this embodiment, operation of this additional movable arm 20 is achieved with the aid of a micromechanical screw 22, supported on the support 24, 24', which is used in this arm 20.

The operation of this screw 22 leads to bending of the additional movable arm 20 outwards into position 20i. This bend outwards is possible in particular as the arm 20 at the end furthest away from the carrier 27 is connected to the support 24, 24' via a web 21. As can be seen from FIG. 6, bending of the arm 20 outwards via the hinge-like web 25 leads to an additional deflection of the carrier 27. This additional deflection of the carrier 27 is supported inter alia also by the sprung arm 26 on the other leg of the U-shaped support 24, 24'. The end 6 of the optical waveguide 2 can thus be advantageously aligned even more accurately to the end surface of the optical component to which it is to be connected.

FIG. 7 shows a side view of a second embodiment of an optical coupling device in which the support 24' has an additional movable arm 20'. As in the embodiment in FIG. 6, this arm 20' is provided with a micromechanical screw 22', which is supported on the outer side of the leg of the U-shaped support 24' furthest away from the optical component. Operation of this screw 22' leads to a movement of the arm 20' outwards, which movement is transferred in turn via the web 25 to the carrier 27 and is used to align the end 6 of the optical waveguide 2.

In the embodiment in FIG. 7, the additional arm 20' is formed in two parts, the two parts being connected via a hinge-like connection 29. In addition, the arm 20' is connected to the base of the U-shaped support 24' via a web 21' that is folded in the resting state.

The two-part arm 20', which could even have more parts, has the advantage of guaranteeing an even finer alignment of the end 6 of the optical waveguide 2. The multiple-part additional arm 20' is actually used as a gearing down of the movement outwards (deflection) generated by operation of the micromechanical screw 22' transferred to the deflection of the carrier 27. Turning the screw 22' by a thread thus leads via the multiple-part arm 20' to a deflection of the carrier 27 of the optical waveguide 2. In this case the magnitude of the deflection of the end 6 of the optical waveguide 2 is only equal to a fraction of the thread turn made thanks to the gearing down due to the multiple-part arm 20'.

FIG. 8 shows a side view of an alternative optical coupling device with a holder 13', which has a U-shaped support 14', which as in the other embodiments surrounds the variable-length element 18 between its two legs. In addition, the support 14' has on the leg outermost relative to the optical component an additional movable arm 12 that has several parts—here 2. In contrast to the embodiments in FIGS. 6 and 7, the operation of this additional arm 12 is not achieved via a screw. The arm is rather held with one leg of the U-shaped support 14' via a plurality of webs 11a, 11b as well as on the carrier 17' via the hinge-like web 15'. In this embodiment, the webs 11a, 11b, that are only connected to the support 14', can be broken destructively e.g. via a laser influence, which is intended to lead to a deflection of the additional arm 12. This deflection will be transferred similarly as with the embodiment in FIG. 7 to the carrier 17' and result in its deflection. The end 6 of the optical waveguide 2 held by the carrier 17' can thus easily be aligned very accurately.

What is claimed is:

1. Optical coupling device for the alignment of an end of an optical waveguide, with a holder, which is formed from a support to a surface, which contains an end surface to which the end of the optical waveguide is to be connected, and from a variable-length element having a first end and a second end, the first end being attached to the support and the second end being coupled to a carrier canying the optical waveguide, wherein the variable-length element is surrounded at least partly by the support, and the carrier is held via a hinge-like web of the support, the web having a fulcrum and configured to facilitate a deflection of the carrier caused by the variable-length element.

2. Optical coupling device according to claim 1, wherein the carrier is held around the end of the optical waveguide to be aligned via a sprung arm of the support.

3. Optical coupling device according to claim 1, wherein the support, including the web and the carrier are manufactured from a monolithic block.

4. Optical coupling device according to claim 2, wherein the expansion coefficient of the monolithic block is smaller than that of the variable-length element.

5. Optical coupling device according to claim 3, wherein both the monolithic block and the variable-length element are based on metal and thus the latter is attached with the aid of welding technology to the support and/or the carrier.

6. Optical coupling device according to claim 1, wherein the variable-length element is configured such that the the carrier may deflect away from the support to disconnect the connection of the end of the optical waveguide.

7. Optical coupling device according to claim 1, wherein the material of the variable-length element consists of a piezoceramic material.

8. Optical coupling device according to claim 1, wherein the hinge-like web is connected via an additional movable arm to the support, the movement of the additional arm facilitating an even more precise deflection of the carrier than is to be achieved by operation of the variable-length element alone.

9. Optical coupling device according to claim 8, wherein the additional arm is formed of several parts, and accordingly leads a gearing down of its deflection to the deflection of the carrier.

10. Optical coupling device according to claim 8, wherein the movement of the additional arm is provided by operation of a screw connected to the arm.

11. Optical coupling device according to claim 8, wherein the movement of the additional arm is provided by irreversible deformation of part of the arm.

* * * * *